(12) United States Patent
Minamibori et al.

(10) Patent No.: US 10,008,700 B2
(45) Date of Patent: Jun. 26, 2018

(54) PACKAGING MATERIAL AND MOLDED CASE

(71) Applicant: Showa Denko Packaging Co., Ltd., Isehara-shi, Kanagawa (JP)

(72) Inventors: Yuji Minamibori, Hikone (JP); Honglin Wang, Hikone (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 19 days.

(21) Appl. No.: 14/326,615

(22) Filed: Jul. 9, 2014

(65) Prior Publication Data
US 2015/0030910 A1    Jan. 29, 2015

(30) Foreign Application Priority Data

Jul. 29, 2013    (JP) .................................. 2013-156959

(51) Int. Cl.
*H01M 2/00* (2006.01)
*H01M 2/02* (2006.01)
(Continued)

(52) U.S. Cl.
CPC .......... *H01M 2/0287* (2013.01); *B29C 51/08* (2013.01); *B29C 51/14* (2013.01); *B32B 33/00* (2013.01);
(Continued)

(58) Field of Classification Search
CPC ... H01M 2/0202; H01M 2/0287; C09D 11/00; C09D 11/037; C09J 2475/00;
(Continued)

(56) References Cited

U.S. PATENT DOCUMENTS 6,352,762 B1    3/2002  Shimizu et al.
6,506,899 B1 *  1/2003  Simms ................ B01F 17/005
                                                  516/203
(Continued)

FOREIGN PATENT DOCUMENTS

CN    1965046 A    5/2007
CN    101185180 A  5/2008
(Continued)

OTHER PUBLICATIONS

Machine Translation of JP 2009143035 A, Ueki Takayuki et al, Extracted on Jan. 6, 2018. (Year: 2009).*

*Primary Examiner* — Nicholas P D'Aniello
*Assistant Examiner* — Abibatu O Ojo-Amoo
(74) *Attorney, Agent, or Firm* — Keating and Bennett, LLP (57) ABSTRACT

A packaging material 1 includes a heat resistant resin stretched film layer 2 as an outer layer, a thermoplastic resin layer 3 as an inner layer, a metal foil layer 4 arranged between these layers, and a colored ink layer 10 arranged between the metal foil layer 4 and the heat resistant resin stretched film layer 2. As the heat resistant resin stretched film, a heat resistant resin stretched film having a hot water shrinkage rate of 2% to 20% is used, and the heat resistant resin stretched film layer 2 and the colored ink layer 4 are integrally laminated via an easily adhesive layer 30. In this packaging material, at the time of forming and sealing, and even being used in a somewhat severe environment such as high-temperature and humid environment, the colored ink layer will not be detached from the heat resistant resin stretched film layer.

14 Claims, 1 Drawing Sheet

(51) Int. Cl.
 B29C 51/08 (2006.01)
 B29C 51/14 (2006.01)
 B32B 33/00 (2006.01)
 H01M 2/10 (2006.01)
 B29L 31/34 (2006.01)
 B32B 37/12 (2006.01)

(52) U.S. Cl.
 CPC ......... *H01M 2/026* (2013.01); *H01M 2/1094* (2013.01); *B29L 2031/3468* (2013.01); *B32B 37/12* (2013.01); *B32B 2307/402* (2013.01); *B32B 2311/00* (2013.01); *B32B 2457/10* (2013.01); *Y10T 428/25* (2015.01); *Y10T 428/269* (2015.01); *Y10T 428/31522* (2015.04); *Y10T 428/31678* (2015.04)

(58) Field of Classification Search
 CPC ....... C09J 175/04; C09J 163/00; B32B 37/12; B32B 2307/402; B32B 2307/4023; B29C 51/14
 USPC .......................................................... 429/163
 See application file for complete search history.

(56) References Cited

U.S. PATENT DOCUMENTS

| | | | |
|---|---|---|---|
| 8,129,008 B2* | 3/2012 | Hata | H01M 2/0257 428/34.1 |
| 2009/0130407 A1 | 5/2009 | Hata | |
| 2010/0076119 A1* | 3/2010 | Ishizawa | C08G 59/226 523/400 |
| 2011/0104546 A1 | 5/2011 | Seino et al. | |
| 2012/0006841 A1* | 1/2012 | Picchietti | B32B 27/08 220/810 |
| 2012/0135301 A1* | 5/2012 | Akita | H01M 2/0212 429/185 |
| 2013/0344320 A1 | 12/2013 | Ogata et al. | |
| 2014/0087241 A1 | 3/2014 | Kuramoto et al. | |

FOREIGN PATENT DOCUMENTS

| | | | |
|---|---|---|---|
| CN | 102473866 A | | 5/2012 |
| JP | 62-204940 A | | 9/1987 |
| JP | 02-3432 A | | 1/1990 |
| JP | 11-20104 A | | 1/1999 |
| JP | 2001-001398 A | | 1/2001 |
| JP | 2003-340965 A | | 12/2003 |
| JP | 2006-331897 A | | 12/2006 |
| JP | 2007-203532 A | | 8/2007 |
| JP | 2007-290389 A | | 11/2007 |
| JP | 2009143035 A | * | 7/2009 |
| JP | 2009-289533 A | | 12/2009 |
| JP | 2011-054563 A | | 3/2011 |
| JP | 2011-096552 A | | 5/2011 |
| JP | 2011-204674 A | | 10/2011 |
| JP | 2013-112695 A | | 6/2013 |
| JP | 2013-129059 A | | 7/2013 |
| WO | 2005/108518 A2 | | 11/2005 |
| WO | 2011/016506 A1 | | 2/2011 |
| WO | 2012/121149 A1 | | 9/2012 |
| WO | 2012/133663 A1 | | 10/2012 |

\* cited by examiner

PACKAGING MATERIAL AND MOLDED CASE

TECHNICAL BACKGROUND

The present invention relates to a packaging material and a molded case preferably used as a case for a stationary type secondary battery (lithium ion secondary battery) or a secondary battery (lithium ion secondary battery) for use in, e.g., laptop computers, mobile phones, or automobiles, and also preferably used as a packaging material for, e.g., food products or pharmaceutical products.

TECHNICAL BACKGROUND

In a battery, such as, e.g., a lithium ion secondary battery, it is becoming more likely to be required to be colored to unify its color with the outer appearance of a device such as an electric apparatus to which the battery is mounted. To provide a solid feeling and a sense of quality, devices are likely to be colored black. In such cases, batteries are becoming more likely to be colored in black. It is also becoming increasingly more likely to be colored in other various colors.

In order to color the battery in black, etc., there are means such as coloring the resin layer constituting the battery packaging material, proving a print layer under the base resin layer, etc.

For example, as a packaging material for batteries having a colored layer, a packaging material having a structure in which a base layer, an adhesive agent layer, a metal foil layer, and a heat adhesive resin layer are laminated in this order, and a pigment is added to any one of the layers among the base layer, the adhesive agent layer, and the metal foil layer (see Patent Document 1), an outer packaging material for batteries having a layer containing a blackbody material such as a carbon material, etc. (see Patent Document 2), and a structure in which a white resin film base material is laminated on a surface of a battery outer packaging material and a white ink layer is laminated on the surface of the white resin film base material (see Patent Document 3), are known.

Patent Document 1: Japanese Unexamined Patent Application Publication No. 2011-054563

Patent Document 2: Japanese Unexamined Patent Application Publication No. 2011-096552

Patent Document 3: Japanese Unexamined Patent Application Publication No. 2009-289533

SUMMARY OF THE INVENTION

Problems to be Solved by the Invention

However, in cases where a colored print layer containing a carbon black, etc., as a pigment is provided on an inner surface of an outer resin layer constituting a battery packaging material to add a black color, etc., to a battery, there was a problem described below.

That is, when molding the aforementioned coloration packaging material into a container (case) shape by deep drawing or bulging, since the adhesion between the heat resistant resin stretched film layer as an outer layer and the colored layer is not sufficient, the colored layer will be detached, thereby showing the base layer (not black colored) to the outside, which causes a problem of losing the evenness of color (black coloration, etc.)

Such partial detachment of the colored print layer also occurs when sealing the coloration packaging material after encapsulating electrodes and electrolytes and/or when the battery packaged by a coloration packaging material is used in a somewhat harsh environment such as, e.g., high-temperature and humidity.

Some preferred embodiments of the present invention were made in view of the aforementioned technical background, and aim to provide a packaging material that a colored ink layer will not be detached from a heat resistant resin stretched film layer at the time of molding or sealing and even at the time of being used in a somewhat harsh environment such as, e.g., high-temperature and humidity.

To achieve the aforementioned purpose, some preferred embodiments of the present invention provide the following means.

(1) A packaging material comprising:
a heat resistant resin stretched film layer as an outer layer;
a thermoplastic resin layer as an inner layer;
a metal foil layer arranged between the heat resistant resin stretched film layer and the thermoplastic resin layer; and
a colored ink layer arranged between the metal foil layer and the heat resistant resin stretched film layer,
wherein as the heat resistant resin stretched film, a heat resistant resin stretched film having a hot water shrinkage rate of 2% to 20% is used, and
wherein the heat resistant resin stretched film layer and the colored ink layer are integrally laminated via an easily adhesive layer.

(2) The packaging material as recited in the aforementioned Item 1, wherein the easily adhesive layer contains one or more kinds of resins selected from the group consisting of an epoxy resin, a urethane resin, an acrylic acid ester resin, a methacrylic acid ester resin, and a polyethylenimine resin.

(3) The packaging material as recited in the aforementioned Item 1, wherein the easily adhesive layer contains a urethane resin and an epoxy resin.

(4) The packaging material as recited in the aforementioned Item 3, wherein in the easily adhesive layer, a content mass ratio of the urethane resin/the epoxy resin is within a range of 98/2 to 40/60.

(5) The packaging material as recited in the aforementioned Item 1, wherein the easily adhesive layer contains one or more kinds of acrylic resins selected from the group consisting of an acrylic acid ester resin and a methacrylic acid ester resin, and an epoxy resin.

(6) The packaging material as recited in the aforementioned Item 5, wherein in the easily adhesive layer, a content mass ratio of the acrylic resin/the epoxy resin is within a range of 98/2 to 40/60.

(7) The packaging material as recited in any one of the aforementioned Items 1 to 6, wherein the easily adhesive layer is an adhesive layer formed by applying a resin-aqueous emulsion on the heat resistant resin stretched film layer.

(8) The packaging material as recited in any one of the aforementioned Items 1 to 7, wherein as the heat resistant resin stretched film, a biaxially stretched polyamide film having a hot water shrinkage rate of 2% to 20%, a biaxially stretched polyethylene naphthalate film having a hot water shrinkage rate of 2% to 20%, or a biaxially stretched polyethylene terephthalate film having a hot water shrinkage rate of 2% to 20% is used.

(9) The packaging material as recited in any one of the aforementioned Items 1 to 8, wherein the hot water shrinkage rate of the heat resistant resin stretched film is 2.5% to 10%.

(10) The packaging material as recited in any one of the aforementioned Items 1 to 9, wherein the colored ink layer contains carbon black, diamine, polyol, and a curing agent.

(11) The packaging material as recited in any one of the aforementioned Items 1 to 10, further comprising a matte coat layer laminated on an outer surface of the heat resistant resin stretched film layer.

(12) A molded case formed by deep drawing or bulging the packaging material as recited in any one of the aforementioned Items 1 to 11.

(13) The molded case as recited in the aforementioned Item 12, wherein the molded case is used as a battery case.

According to the embodiment as recited in the aforementioned item (1), a colored ink layer is provided between the metal foil layer and the heat resistant resin stretched film layer, and the heat resistant resin stretched film layer and the colored ink layer are integrally laminated via an easily adhesive layer. Also, as the heat resistant resin stretched film, since a heat resistant resin stretched film having a hot water shrinkage rate of 2% to 20% is used. Therefore, when the packaging material is subjected to forming, such as, e.g., deep drawing or bulging, or when the packaging material is sealed for encapsulation, the colored ink layer is sufficiently adhered to the heat resistant resin stretched film layer, so the colored ink layer will not be detached from the heat resistant resin stretched film layer. Also, even if used in a somewhat harsh environment such as, e.g., high-temperature and humidity, the colored ink layer will not be detached from the heat resistant resin stretched film layer.

According to the embodiment as recited in the aforementioned item (2), the easily adhesive layer has a structure containing one or more kinds of resins selected from the group consisting of an epoxy resin, a urethane resin, an acrylic acid ester resin, a methacrylic acid ester resin, and a polyethylenimine resin. Therefore, the colored ink layer can be sufficiently prevented from being detached from the heat resistant resin stretched film layer at the time of forming, sealing, or being used in a somewhat harsh environment such as, e.g., high-temperature and humidity.

According to the embodiment as recited in the aforementioned item (3), since the easily adhesive layer has a structure containing a urethane resin and an epoxy resin, the colored ink layer can be sufficiently prevented from being detached from the heat resistant resin stretched film layer at the time of forming, sealing, or being used in a somewhat harsh environment such as, e.g., high-temperature and humidity.

According to the embodiment as recited in the aforementioned item (4), since the content mass ratio of the urethane resin/the epoxy resin is within a range of 98/2 to 40/60, the colored ink layer can be sufficiently prevented from being detached from the heat resistant resin stretched film layer at the time of forming, sealing, or being used in a somewhat harsh environment such as high-temperature and humidity.

According to the embodiment as recited in the aforementioned item (5), since the easily adhesive layer has a structure containing a specific acrylic resin and epoxy resin, the colored ink layer can be sufficiently prevented from being detached from the heat resistant resin stretched film layer at the time of forming, sealing, or being used in a somewhat harsh environment such as high-temperature and humidity.

According to the embodiment as recited in the aforementioned item (6), since the content mass ratio of the acrylic resin/the epoxy resin is within a range of 98/2 to 40/60, the colored ink layer can be sufficiently prevented from being detached from the heat resistant resin stretched film layer at the time of forming, sealing, and being used in a somewhat harsh environment such as high-temperature and humidity.

According to the embodiment as recited in the aforementioned item (7), since the easily adhesive layer is an adhesive layer formed by preliminarily applying a resin-aqueous emulsion on the heat resistant resin stretched film layer, the colored ink layer can be sufficiently prevented from being detached from the heat resistant resin stretched film layer at the time of forming, sealing, or being used in a somewhat harsh environment such as high-temperature and humidity.

According to the embodiment as recited in the aforementioned item (8), as the heat resistant resin stretched film, since a biaxially stretched film made of a specific resin having a hot water shrinkage rate of 2% to 20% is used, the effect of preventing the colored ink layer from being detached from the heat resistant resin stretched film layer at the time of forming, sealing, or being used in a somewhat harsh environment such as high-temperature and humidity can be further improved.

According to the embodiment as recited in the aforementioned item (9), since the hot water shrinkage rate of the heat resistant resin stretched film is 2.5% to 10%, the colored ink layer can be more sufficiently prevented from being detached from the heat resistant resin stretched film layer at the time of forming, sealing, or being used in a somewhat harsh environment such as high-temperature and humidity.

According to the embodiment as recited in the aforementioned item (10), since the colored ink layer contains carbon black, diamine, polyol, and a curing agent, the colored ink layer can be formed quickly and more sufficiently prevented from being detached from the heat resistant resin stretched film layer at the time of forming, sealing, or being used in a somewhat harsh environment such as high temperature and humidity.

According to the embodiment as recited in the aforementioned item (11), since a matte coat layer laminated on an outer surface of the heat resistant resin stretched film layer is further provided, good slidability can be provided on the surface, and a packaging material having good formability can be provided.

According to the embodiment as recited in the aforementioned item (12), not only at the time of sealing but also even at the time of being used in a somewhat harsh environment such as, e.g., high-temperature or humidity, a molding case in which the colored ink layer will not be detached from the heat resistant resin stretched film layer can be provided.

According to the embodiment as recited in the aforementioned item (13), not only at the time of sealing but also at the time of being used in a somewhat harsh environment such as, e.g., high-temperature or humidity, a battery case in which the colored ink layer will not be detached from the heat resistant resin stretched film layer can be provided.

BRIEF DESCRIPTION OF THE DRAWINGS

The preferred embodiments of the present invention are shown by way of example, and not limitation, in the accompanying figures, in which.

PREFERRED EMBODIMENTS FOR CARRYING OUT THE INVENTION

Figure 1:
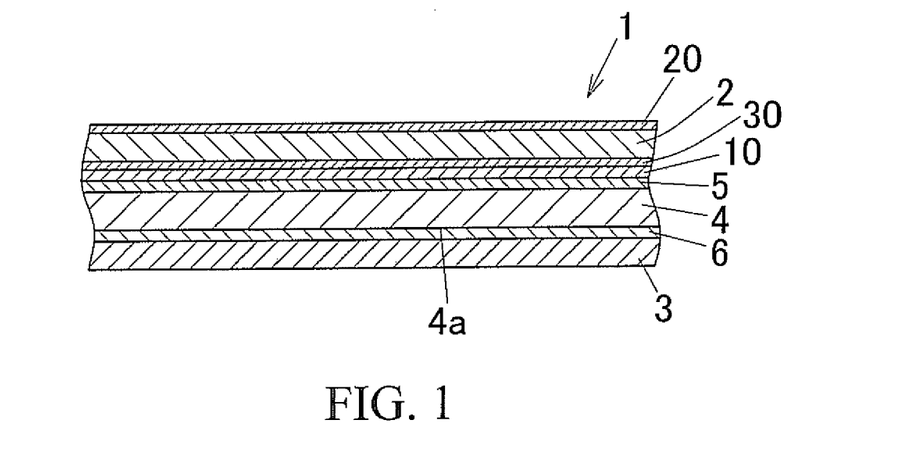
FIG. 1 is a cross-sectional view showing an embodiment of a packaging material according to the present invention.

In the following paragraphs, some preferred embodiments of the invention will be described by way of example and not limitation. It should be understood based on this disclosure that various other modifications can be made by those in the art based on these illustrated embodiments. An embodiment of a packaging material 1 according to the present invention is shown in FIG. 1. This packaging material 1 is used as a packaging material for a lithium ion secondary battery. That is, this packaging material 1 is subjected to forming, such as deep drawing, and used as a secondary battery case.

The packaging material 1 has a structure in which a heat resistant resin stretched film layer (outer layer) 2 is integrally laminated on the upper surface of a metal foil layer 4 via a first adhesive agent layer 5 and a thermoplastic resin layer (inner layer) 3 is integrally laminated on the lower surface of the metal foil layer 4 via a second adhesive agent layer 6. On the lower surface of the heat resistant resin stretched film layer 2, an easily adhesive layer 30 is laminated, and on the lower surface of the easily adhesive layer 30, a colored ink layer 10 is laminated. The colored ink layer 10 and the metal foil layer 4 are integrally adhered via the first adhesive agent layer 5 (see FIG. 1).

That is, the colored ink layer 10 is arranged between the metal foil layer 4 and the heat resistant resin stretched film layer 2. In this embodiment, the easily adhesive layer 30 is laminated on the lower surface of the heat resistant resin stretched film layer 2 by a gravure coating method, and the colored ink layer 10 is laminated on the lower surface of the easily adhesive layer 30 by printing. Further, a matte coat layer 20 is laminated on the upper surface (outer surface) of the heat resistant resin stretched film layer 2.

The heat resistant resin stretched film layer (outer layer) 2 is a member mainly undertaking a role of securing good formability as a packaging material. That is, it undertakes a role of preventing breakage due to necking of an aluminum foil at the time of forming. In the present invention, the heat resistant resin stretched film layer 2 is required to be constituted by a heat resistant resin stretched film having a hot water shrinkage rate of 2% to 20%. If the hot water shrinkage rate is below 2%, the colored ink layer will be detached from the heat resistant resin stretched film layer at the time of being used in a somewhat harsh environment such as high-temperature and humidity, etc.

On the other hand, if the hot water shrinkage rate exceeds 20%, the colored ink layer of the packaging material will be detached from the heat resistant resin stretched film layer at the time of performing forming such as deep drawing, bulging, etc. Above all, as the heat resistant resin stretched film, it is more preferable to use a heat resistant resin stretched film having a hot water shrinkage rate of 2.5 to 10%. Furthermore, it is preferable to use a heat resistant resin stretched film having a hot water shrinkage rate of 3.0 to 6.0%, and it is especially preferable to use a heat resistant resin stretched film having a hot water shrinkage rate of 3.5% to 5.0%.

The "hot water shrinkage rate" denotes a dimensional change rate in the stretched direction of a test piece before and after immersing a test piece (10 cm×10 cm) of a heat resistant resin stretched film 2 in heated water at a temperature of 95° C. for 30 minutes, and is calculated using the following equation.

Hot water shrinkage rate(%)={$(X-Y)/X$}×100, wherein "X" is a dimension in the stretched direction before the immersion treatment, and "Y" is a dimension in the stretched direction after the immersion treatment.

The hot water shrinkage rate when employing a biaxially stretched film denotes an average of dimensional change rates in the two stretched directions.

The hot water shrinkage rate of the heat resistant resin stretched film can be controlled by, for example, adjusting the heat setting temperature during the stretching.

The heat resistant resin stretched film layer (outer layer) 2 is not especially limited, but a stretched polyamide film such as a stretched nylon film, a stretched polyester film, etc., can be exemplified. Above all, as the heat resistant resin stretched film layer 2, it is especially preferable to use a biaxially stretched polyamide film such as a biaxially stretched nylon film, a biaxially stretched polybutylene terephthalate (PBT) film, a biaxially stretched polyethylene terephthalate (PET) film, or a biaxially stretched polyethylene naphthalate (PEN) film.

Also, as the heat resistant resin stretched film layer 2, it is preferable to use a heat resistant resin biaxially stretched film stretched by a simultaneous biaxially stretching method. Further, it is preferable to use a heat resistant resin biaxially stretched film in which the ratio (MD/TD) of "the hot water shrinkage rate in the M direction" to the "hot water shrinkage rate in the T direction" is within a range of 0.9 to 1.1. When employing a structure in which the aforementioned ratio (MD/TD) is within a range of 0.9 to 1.1, a packaging material having especially good formability can be obtained.

The "M direction" means a "machine direction" and the "T direction" means a "direction orthogonal to the M direction." The nylon is not especially limited, but, for example, nylon-6, nylon-6,6, MXD nylon, etc., can be exemplified.

The heat resistant resin stretched film layer 2 can be formed as a single-layer (singled stretched film) or, for example, a multi-layer of a stretched polyester film/a stretched polyamide film (a multi-layer of a stretched PET film/a stretched nylon film, etc.)

Above all, as the heat resistant resin stretched film layer 2, it is preferable to use a biaxially stretched polyamide film having a shrinkage rate of 2% to 20%, a biaxially stretched polyethylene naphthalate (PEN) film having a shrinkage rate of 2% to 20%, or biaxially stretched polyethylene terephthalate (PET) film having a shrinkage rate of 2% to 20%. In this case, at the time of forming, sealing, or being used in a somewhat harsh environment such as high-temperature or humidity, the effect of preventing the colored ink layer from being detached from the heat resistant resin stretched film layer can be further improved.

The thickness of the heat resistant resin stretched film layer 2 is preferably 12 μm to 50 μm. When using a polyester film, the thickness is preferably 12 μm to 50 μm, and when using a nylon film, the thickness is preferably 15 μm to 50 μm. By setting the thickness to the aforementioned preferable lower limit or higher, sufficient strength can be secured as a packaging material, and by setting the thickness to the aforementioned preferable upper limit or lower, the stress to be caused at the time of bulging or drawing can be reduced, thereby improving the formability.

On the inner surface (the metal foil layer 4 side surface) of the heat resistant resin stretched film layer 2, an easily adhesive layer 30 is required to be laminated. By coating a polar resin, etc., excellent in viscosity and adhesive property on the surface of the heat resistant resin stretched film layer 2 originally poor in adhesive property to laminate the easily adhesive layer 30, the adhesion and adhesive property to the colored ink layer 10 can be improved. In addition, on the inner surface of the heat resistant resin stretched film layer 2 (surface on which the easily adhesive layer 30 is to be laminated), it is preferable that the wettability is preliminarily increased by performing corona processing, etc., before laminating the easily adhesive layer 30.

The forming method of the easily adhesive layer 30 is not especially limited. For example, the easily adhesive layer 30 can be formed by applying an aqueous emulsion (water-based emulsion) of one or more kinds of resins selected from the group consisting of an epoxy resin, a urethane resin, an acrylic acid ester resin, a methacrylic acid ester resin, and a polyethylenimine resin on the surface of the heat resistant resin stretched film 2, and then drying. The application method is not especially limited, but for example, a spray coating method, a gravure roll coat method, a reverse roll coat method, a lip coat method, etc., can be exemplified.

It is preferable that the easily adhesive layer 30 has a structure containing one or more kinds of resins selected from the group consisting of an epoxy resin, a urethane resin, an acrylic acid ester resin, a methacrylic acid ester resin, and a polyethylenimine resin. By employing such a structure, the adhesive strength of the heat resistant resin stretched film layer 2 and the colored ink layer 10 can be further improved. Therefore, when the packaging material is subjected to deep drawing or bulging, etc., and when the packaging material is sealed for encapsulation, the colored ink layer 10 will not be detached from the heat resistant resin stretched film layer 2 and even when the packaging material 1 is used in a somewhat harsh environment such as high-temperature and humidity, the colored ink layer 10 will not be detached from the heat resistant resin stretched film layer 2.

Above all, it is especially preferable that the easily adhesive layer 30 has a structure containing a urethane resin and an epoxy resin, or containing a (meta) acrylic acid ester resin and an epoxy resin. In this case, the adhesive strength of the heat resistant resin stretched film layer 2 and the colored ink layer 10 can be further improved.

When employing the aforementioned former structure, the content mass ratio of the urethane resin/the epoxy resin is preferred to be in a range of 98/2 to 40/60, and in this case, the adhesive strength of the heat resistant resin stretched film layer 2 and the colored ink layer 10 can be further improved. If the content ratio of the urethane resin becomes larger than the content mass ratio (98/2) of the urethane resin/the epoxy resin, insufficiency in the degree of cross-linking occurs, thereby making it difficult to obtain sufficient solvent resistance and adhesive strength, so it is not preferable. On the other hand, if the content ratio of the urethane resin becomes smaller than the content mass ratio (40/60) of the urethane resin/the epoxy resin, it is not preferable because it takes too much time for the cross-linking to be completed. Above all, the content mass ratio of the urethane resin/the epoxy resin of the easily adhesive layer 30 is preferably within a range of 90/10 to 50/50.

Also, when employing the aforementioned latter structure, the content mass ratio of the (meta) acrylic acid ester resin/the epoxy resin in the easily adhesive layer 30 is preferred to be in a range of 98/2 to 40/60, and in this case, the adhesive strength of the heat resistant resin stretched film layer 2 and the colored ink layer 10 can be further improved. If the content ratio of the (meta) acrylic acid ester resin becomes larger than the content mass ratio (98/2) of the (meta) acrylic acid ester resin/the epoxy resin, insufficiency in the degree of cross-linking occurs, thereby making it difficult to obtain sufficient solvent resistance and adhesive strength, so it is not preferable.

On the other hand, if the content ratio of the (meta) acrylic acid ester resin becomes smaller than the content mass ratio (40/60) of the (meta) acrylic acid ester resin/the epoxy resin, it is not preferable because it takes too much time for the cross-linking to be completed. Above all, the content mass ratio of the (meta) acrylic acid ester resin/the epoxy resin of the easily adhesive layer 30 is preferably within a range of 90/10 to 50/50.

As the resin aqueous emulsion (resin-aqueous emulsion) for forming the easily adhesive layer 30, surfactants such as a glycol group, ethylene oxide additives of glycol, etc., can be added. In this case, since sufficient defoaming effect can be obtained, an easily adhesive layer 30 excellent in surface smoothness can be formed. It is preferable that 0.01 mass % to 2.0 mass % of the surfactant is contained in the resin aqueous emulsion.

Also, it is preferable that fine inorganic particles such as silica, colloidal silica, etc., are included in the resin aqueous emulsion (water based emulsion) for forming the easily adhesive layer 30. In this case, block prevention effects can be obtained. It is preferable that 0.1 pts.mass to 10 pts.mass of the fine inorganic particles is added to 100 pts.mass of the resin component.

It is preferable that the forming amount of the easily adhesive layer 30 (solid quantity after drying) is in a range of 0.01 g/m$^2$ to 0.5 g/m$^2$. When it is 0.01 g/m$^2$ or more, the heat resistant resin stretched film layer 2 and the colored ink layer 10 can be sufficiently adhered, and when 0.5 g/m$^2$ or less, costs can be reduced, thereby making it economical.

It is preferable that the content rate of the resin in the easily adhesive layer (after drying) 30 is 88 mass % to 99.9 mass %.

In the present invention, the colored ink layer 10 is a layer arranged between the metal foil layer 4 and the heat resistant resin stretched film layer 2 and configured to apply color (including achromatic color) to the outer surface side of the packaging material 1.

The colored ink layer 10 is not especially limited, but, for example, a black ink layer, a white ink layer, a gray ink layer, a red ink layer, a blue ink layer, a green ink layer, a yellow ink layer, etc., can be exemplified.

The black ink layer 10 will be explained. The black ink layer 10 is normally formed by a composition including carbon black.

Above all, it is preferable, but not specifically limited, that the black ink layer 10 has a structure including carbon black, diamine, polyol and a curing agent.

It is preferable that, in the black ink layer (ink layer after drying) 10, the content rate of the carbon black is 15 mass % to 60 mass %, and a total content rate of the diamine, the polyol, and the curing agent is 40 mass % to 85 mass %. Above all, it is especially preferable that the content rate of carbon black is 20 mass % to 50 mass %.

If the content rate of carbon black is less than 15 mass %, the metal glossiness of the metal foil layer 4 remains, resulting in deteriorated solid feeling and causing partially uneven coloring when forming, and therefore it is not preferable. On the other hand, if the content rate of carbon black exceeds 60 mass %, the black ink layer 10 hardens and becomes fragile, thereby reducing the adhesive strength to the metal foil layer 4, which in turn causes detachment between the metal foil layer 4 and the black ink layer 10 at the time of forming, and therefore it is not preferable.

It is preferable that the black ink layer 10 has a structure including 2 to 20 pts.mass of the curing agent for a total of 100 pts.mass of the diamine, the carbon black, and the polyol. If the curing agent is less than 2 pts.mass, detachment is more likely to occur between the metal foil layer 4 and the black ink layer 10 at the time of forming, and if the curing agent exceeds 20 pts.mass, blocking occurs at the time of drawing out (rewinding) the packaging material 1 in a wound state, thereby causing inconveniences such as occurrence of imprinting and attachment to the outer surface of the heat resistant resin stretched film layer 2 and/or thermoplastic resin layer 3, and therefore it is not preferable.

It is preferable to use a carbon black having an average particle diameter of 0.2 μm to 5 μm.

The diamine is not especially limited, but, for example, ethylenediamine, dimer diamine, 2-hydroxyethyl ethylenediamine, 2-hydroxyethyl propylene diamine, dicyclohexyl methane diamine, etc., can be exemplified. Above all, as the diamine, it is preferable to use one or more kinds of diamines selected from the group consisting of ethylenediamine, dimer diamine, 2-hydroxyethyl ethylenediamine, 2-hydroxyethyl propylene diamine, and dicyclohexyl methane diamine.

The diamine is faster in reaction rate with the curing agent (isocyanate, etc.) than polyol, which makes it possible to realize hardening in a short amount of time. The diamine reacts with the curing agent as well as with polyol, which promotes the cross-linked hardening of the ink composition.

The polyol is not especially limited, but it is preferable to use one or more types of polyols selected from the group consisting of polyurethane-based polyol, polyester-based polyol and polyether-based polyol.

It is preferable that the number average molecular weight of the polyol is within a range of 1,000 to 8,000. When it is 1,000 or more, the adhesive strength after curing can be increased, and when it is 8,000 or less, the reaction rate with the curing agent can be increased.

The curing agent is not especially limited, but, for example, isocyanate compound, etc., can be exemplified. As the isocyanate compound, for example, various types of isocyanate compounds of aromatic system, aliphatic system or alicyclic system can be used. Specifally, tolylene diisocyanate (TDI), diphenyl methane diisocyanate, hexamethylene diisocyanate (HDI), isophorone diisocyanate, etc., can be exemplified.

The colored ink layer (excluding the black ink layer) will be explained. It is preferable that the colored ink layer (excluding the black ink layer) 10 is constituted by a cured film of a colored ink composition including a two-liquid curing type polyester polyurethane resin binder of a polyester resin as a main ingredient and a multifunctional isocyanate compound as a curing agent and a color pigment including inorganic pigments.

As the color pigment, the structure containing at least an inorganic pigment is employed. As the color pigment, other than the inorganic pigment, for example, an azo-based pigment, a phthalocyanine-based pigment, a condensed polycyclic-based pigment, etc., can be exemplified. Also, the inorganic pigment is not especially limited, but, for example, carbon black, calcium carbonate, titanium oxide, zinc oxide, iron oxide, aluminum powder, etc., can be exemplified. As the inorganic pigment, it is preferable to use an inorganic pigment having an average particle size of 0.1 μm to 5 μm and it is especially preferable to use inorganic pigments having an average particle size of 0.5 μm to 2.5 μm. When dispersing the color pigment, it is preferable to disperse color pigments using a pigment dispersing device. When dispersing the color pigments, a pigment dispersant such as a surfactant, etc., can be used as well.

It is preferable that 50 mass % or more of the color pigments are constituted by the inorganic pigments. In this case, since the hiding power to conceal the metal foil layer 4 can be sufficiently obtained, thereby making it possible to form a colored ink layer 10 having a specific color and capable of sufficiently providing a sense of quality. Above all, it is preferable that 60 mass % or more of the color pigments are constituted by the inorganic pigments.

It is preferable that the thickness of the colored ink layer 10 (after drying) is 1 μm to 4 μm. If it is 1 μm or more, the color and gloss of the metal foil layer 4 can be sufficiency concealed without leaving translucency in the color quality of the colored ink layer 10. Also, by setting the thickness to 4 μm or less, the colored ink layer 10 can be sufficiently prevented from being partially broken at the time of forming.

The colored ink layer 10 is not especially limited, but it can be formed by printing (coating), for example, 1) an ink composition containing carbon black, diamine, polyol, a curing agent and organic solvent, or 2) a colored ink composition containing a two-liquid curing type polyester polyurethane resin binder of a polyester resin as a main ingredient and a multifunctional isocyanate compound as a curing agent, and a color pigment containing inorganic pigments onto the surface of the easily adhesive layer 30 which is arranged on the lower surface of the heat resistant resin stretched film layer 2 using a gravure printing method, etc., The organic solvent is not especially limited, but for example, toluene, etc., can be exemplified.

The method for forming the colored ink layer 10 is not especially limited, but for example, a gravure printing method, a reverse roll coat method, and a lip roll coat method can be exemplified.

The thermoplastic resin layer (inner layer) 3 plays the role of giving excellent chemical resistance against highly corrosive electrolyte used in a lithium ion secondary battery, etc., and giving heat-sealing characteristics to the packaging material.

The thermoplastic resin layer 3 is not especially limited, but it is preferable to be a thermoplastic resin non-stretched film layer. The thermoplastic resin non-stretched film layer 3 is not especially limited, but it is preferable to be constituted by a non-stretched film made of at least one kind of thermoplastic resin selected from the group consisting of polyethylene, polypropylene, olefin-based copolymer, and their acid modifications and ionomers.

It is preferable that the thickness of the thermoplastic resin layer 3 is set to 20 μm to 80 μm. By setting the thickness to 20 μm or more, generation of pinholes can be sufficiently prevented, and by setting it to 80 μm or less, the resin consumption can be reduced, thereby making the cost reduction possible. Above all, it is especially preferable that the thickness of the thermoplastic resin layer 3 is set to 30 μm to 50 μm. It should be noted that the thermoplastic resin layer 3 can be a single-layer or a multi-layer.

The metal foil layer 4 plays the role of providing gas barrier characteristics that preventing invasion of oxygen and/or moisture to the packaging material 1. The metal foil layer 4 is not especially limited, but for example, an aluminum foil and a copper foil, etc., can be exemplified, and an aluminum foil is generally used. It is preferable that the thickness of the metal foil layer 4 is 20 μm to 100 μm. If it is 20 μm or more, generation of pinholes can be prevented when manufacturing the metal foil, and if it is 100 μm or less, the stress to be caused during bulging or drawing can be kept small, thereby making it possible to improve the formability.

It is preferable that, in the metal foil layer 4, at least the inner side surface 4a (surface on the second adhesive agent layer 6 side) is subjected to a chemical conversion treatment. By being subjected to such a chemical conversion treatment, corrosion of the metal foil surface caused by the contents (electrolyte, food product, and pharmaceutical product, etc.) can be sufficiently prevented. For example, the metal foil is subjected to a chemical conversion treatment by the following treatment. That is, for example, the surface of the metal foil to which degreasing processing was performed is subjected to a chemical conversion treatment by drying after applying either 1) an aqueous solution of a mixture of phosphoric acid, chromic acid and a metal salt of fluoride;

2) an aqueous solution of a mixture of phosphoric acid, chromic acid, fluoride metal salt, and non-metal salt; or 3) an aqueous solution of a mixture of acrylic resin and/or phenolic resin, phosphoric acid, chromic acid, and fluoride metal salt.

The first adhesive agent layer 5 is not especially limited, but for example, an adhesive agent layer formed by a two-part reaction type adhesive agent, etc., can be exemplified. As the two-part reaction type adhesive agent, for example, a two-part reaction type adhesive agent constituted by a first solution made of one or more kinds of polyols selected from the group consisting of polyurethane-based polyol, polyester-based polyol and polyether-based polyol and a second solution (curing agent) made of isocyanate can be exemplified. The first adhesive agent layer 5 can be formed by, for example, applying an adhesive agent such as the two-part reaction type adhesive agent on the "upper surface of the metal foil layer 4" and/or "the lower surface of the colored ink layer 10 laminated on the lower surface of the heat resistant resin layer 2 via the easily adhesive layer 30" using a method such as a gravure coating method.

The second adhesive agent layer 6 is not especially limited, but for example, an adhesive agent layer formed by a polyurethane-based adhesive agent, an acrylic adhesive agent, an epoxy-based adhesive agent, a polyolefin-based adhesive agent, an elastomer-based adhesive agent, and a fluorine-based adhesive agent, etc., can be exemplified. Above all, it is preferable that an acrylic adhesive agent and a polyolefin-based adhesive agent is used, and in this case, the electrolyte resistance and the water vapor barrier characteristics of the packaging material 1 can be improved.

The matte coat layer 20 is a matte coat layer made of a resin composition in which fine inorganic particles are dispersed and contained in the composition of a heat resistant resin. Above all, it is preferable to be constituted such that the matte coat layer 20 is made of a resin composition in which 0.1 mass % to 60 mass % of fine inorganic particles having an average particle size of 1 μm to 10 μm are contained in a two-liquid curing type heat resistant resin.

As the heat resistant resin, for example, an acrylic resin, an epoxy-based rein, a urethane based resin, a polyolefin-based resin, a fluorine-based resin, and a phenoxy-based resin, etc., can be exemplified, but it is preferable that a fluorine-based resin based on tetrafluoroethylene or fluoroetylene vinyl ether for heat resistance and chemical resistance. The fine inorganic particles are not especially limited, but for example, silica, alumina, calcium oxide, calcium carbonate, calcium sulfate, and calcium silicate can be exemplified, and above all, it is preferable that silica is used. By providing such a matte coat layer 20, good slidability can be given to the surface, and therefore a packaging material 1 having good formability can be obtained. It is preferable that the gloss level of the surface of the matte coat layer 20 is set to 1% to 15%. The gloss level is a value obtained by measuring at a 60° reflection angle using a gloss measuring instrument "micro-TRI-gloss-s" by BYK Co.

In addition, the aforementioned embodiment has a structure in which the first adhesive agent layer 5 and the second adhesive agent layer 6 are provided, but both of these layers 5 and 6 are not essential structural layers, and a structure not having these layers can be employed.

Figure 2:
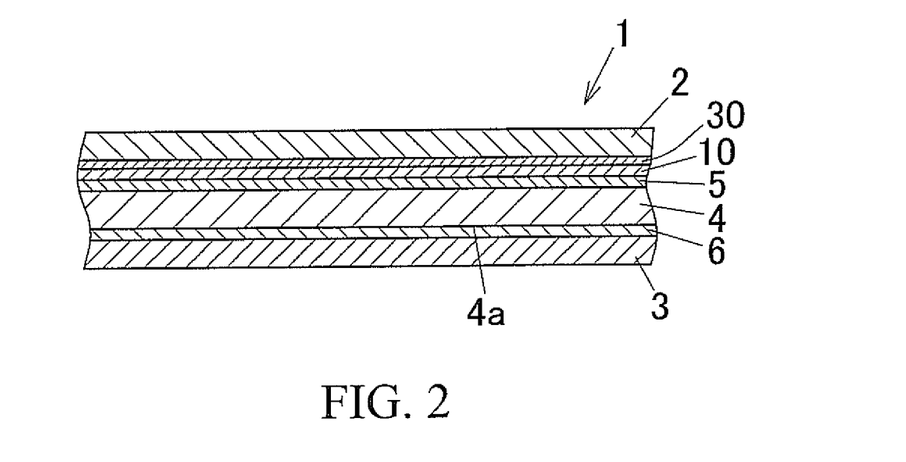
FIG. 2 is a cross-sectional view showing another embodiment of a packaging material according to the present invention.

Also, the embodiment has a structure in which the matte coat layer 20 is laminated on the upper surface of the heat resistant resin stretched film layer 2, but the matte coat layer 20 is not an essential structural layer, and for example, as shown in FIG. 2, a structure not having the matte coat layer 20 can be employed.

By forming the packaging material 1 of the present invention (by deep drawing, bulging, etc.,) a molded case (battery case, etc.) can be obtained.

EXAMPLE

Next, although concrete Examples of the present invention will be explained, the present invention is not specifically limited to these Examples.
<Easily Adhesive Layer Forming Adhesive Agent>
(Adhesive Composition W)

An adhesive agent composition W in which the content rate of non-volatile component was 2 mass % was obtained by mixing 70 pts.mass of "TAKERAKKU W-6010" made by Mitsui Chemicals, Inc. as an aqueous urethane resin, 30 pts.mass of "DENAKORU EX-521" made by Nagase ChemteX Corporation as an aqueous epoxy resin, and 5 pts.mass of colloidal silica "SNOWTEX ST-C" (average grain diameter: 10 nm to 20 nm) made by Nissan Chemical Industries, Ltd. as an antiblocking agent, and further adding ion-exchange water to dilute the mixture.
(Adhesive Agent Composition V)

An adhesive agent composition V in which the content rate of non-volatile composition was 2 mass % was obtained by mixing 70 pts.mass of "RIKABOND SA-513" made by Chuorika Co., Ltd. as an aqueous acrylic acid ester resin, 30 pts.mass of "DENAKORU EX-521" made by Nagase ChemteX Corporation as an aqueous epoxy resin, and 5 pts.mass of colloidal silica "SNOWTEX ST-C" (average particle diameter: 10 nm to 20 nm) made by Nissan Chemical Industries, Ltd. as an antiblocking agent, and further adding ion-exchange water to dilute the mixture.
(Adhesive Agent Composition Z)

An adhesive agent composition Z in which the content rate of non-volatile composition was 2 mass % was obtained by mixing 100 pts.mass of "DENAKORU EX-521" made by Nagase ChemteX Corporation as an aqueous epoxy resin, and 5 pts.mass of colloidal silica "SNOWTEX ST-C" (average particle diameter: 10 nm to 20 nm) made by Nissan Chemical Industries, Ltd. as an antiblocking agent, and further adding ion-exchange water to dilute the mixture.

Example 1

By blending 50 pts.mass of carbon black having an average particle diameter of 0.8 μm, 5 pts.mass of ethylenediamine, and 45 pts.mass of polyester-based polyol (number average molecular weight: 2,500), a main ingredient was obtained. 3 pts.mass of tolylene diisocyanate (TDI) as a curing agent was blended to 100 pts.mass of the main ingredient, 50 pts.mass of toluene was further blended, and then the mixture was stirred well to thereby obtain an ink composition.

On one surface of the biaxially stretched nylon (nylon-6) film 2 (heat resistant resin stretched film layer, MD/TD=0.95) having a thickness of 15 μm and a hot water shrinkage rate of 4.0% obtained by being stretched by a simultaneous biaxially stretching method, the aforementioned adhesive agent composition W was applied by a gravure coating method and dried, and left for one day in the environment of 40° C. to progress the curing reaction, to thereby form an easily adhesive layer 30 having an amount of formation of 0.1 g/m².

Next, on the surface of the easily adhesive layer 30 of the biaxially stretched nylon film 2, the aforementioned ink composition was printed (applied) by a gravure printing method, and then left for one day in the environment of 40° C. to progress drying and cross-linking reaction, to thereby form a black ink layer (colored ink layer) 10 having a thickness of 3 μm.

On the other hand, on both surfaces of an aluminum foil 4 having a thickness of 35 μm, a chemical conversion treatment liquid containing polyacrylic acid, a trivalent chrome compound, water and alcohol was applied, and dried at 180° C. so that the quantity of chromic adhesion became 10 mg/m².

Next, on one surface of the aforementioned chemical conversion treated aluminum foil 4, the black ink layer (colored ink layer) 10 side of the biaxially stretched nylon film 2 is adhered via a polyester-based polyurethane adhesive agent 5, and then on the other surface of the aluminum foil 4, a non-stretched polypropylene film (thermoplastic resin layer) 3 having a thickness of 30 μm is adhered via a polyacrylic adhesive agent 6, thereafter they are left for 5 days in the environment of 40° C. to thereby obtain a laminate.

Further, on the biaxially stretched nylon film 2 of the laminate (on the non-laminated surface), by applying a coat composition containing 80 pts.mass of fluoroethylene vinyl ester, 10 pts.mass of barium sulfate, and 10 pts.mass of silica powder to form a matte coat layer 20 having a thickness of 2 μm, to thereby obtain a packaging material 1 shown in FIG. 1.

Example 2

A packaging material 1 shown in FIG. 1 was obtained in the same manner as in Example 1 except that a biaxially stretched nylon-6 film (MD/TD=0.9) having a thickness of 15 μm and a hot water shrinkage rate of 2.5% obtained by performing a simultaneous biaxially stretching method was used in place of the biaxially stretched nylon-6 film (MD/TD=0.95) having a thickness of 15 μm and a hot water shrinkage rate of 4.0%.

Example 3

A packaging material 1 shown in FIG. 1 was obtained in the same manner as in Example 1 except that a biaxially stretched nylon-6 film (MD/TD=1.0) having a thickness of 15 μm and a hot water shrinkage rate of 3.5% obtained by performing a simultaneous biaxially stretching method was used in place of the biaxially stretched nylon-6 film (MD/TD=0.95) having a thickness of 15 μm and a hot water shrinkage rate of 4.0%.

Example 4

A packaging material 1 shown in FIG. 1 was obtained in the same manner as in Example 1 except that a biaxially stretched nylon-6 film (MD/TD=1.1) having a thickness of 15 μm and a hot water shrinkage rate of 5.0% obtained by performing a simultaneous biaxially stretching method was used in place of the biaxially stretched nylon-6 film (MD/TD=0.95) having a thickness of 15 μm and a hot water shrinkage rate of 4.0%.

Example 5

A packaging material 1 shown in FIG. 1 was obtained in the same manner as in Example 1 except that a biaxially stretched nylon-6 film (MD/TD=0.9) having a thickness of 15 μm and a hot water shrinkage rate of 10% obtained by performing a simultaneous biaxially stretching method was used in place of the biaxially stretched nylon-6 film (MD/TD=0.95) having a thickness of 15 μm and a hot water shrinkage rate of 4.0%.

Example 6

A packaging material 1 shown in FIG. 1 was obtained in the same manner as in Example 1 except that a biaxially stretched nylon-6 film (MD/TD=1.05) having a thickness of 15 μm and a hot water shrinkage rate of 15% obtained by performing a simultaneous biaxially stretching method was used in place of the biaxially stretched nylon-6 film (MD/TD=0.95) having a thickness of 15 μm and a hot water shrinkage rate of 4.0%.

Comparative Example 1

A packaging material 1 was obtained in the same manner as in Example 1 except that it was structured not to provide an easily adhesive layer 30 (i.e., the black ink layer 10 was directly laminated on one surface of the biaxially stretched nylon-6 film 2).

Comparative Example 2

A packaging material 1 was obtained in the same manner as in Example 1 except that a biaxially stretched nylon-6 film (MD/TD=0.7) having a thickness of 15 μm and a hot water shrinkage rate of 1.0% obtained by performing a simultaneous biaxial stretching method was used in place of the biaxially stretched nylon-6 film (MD/TD=0.95) having a thickness of 15 μm and a hot water shrinkage rate of 4.0%.

Comparative Example 3

A packaging material 1 shown in FIG. 1 was obtained in the same manner as in Example 1 except that a biaxially stretched nylon-6 film (MD/TD=0.7) having a thickness of 15 μm and a hot water shrinkage rate of 25% obtained by performing a sequentially biaxially stretching method was used in place of the biaxially stretched nylon-6 film (MD/TD=0.95) having a thickness of 15 μm and a hot water shrinkage rate of 4.0%.

Example 7

A packaging material 1 shown in FIG. 1 was obtained in the same manner as in Example 1 except that a biaxially stretched polyethylene terephthalate (PET) film (MD/TD=1.0) having a thickness of 15 μm and a hot water shrinkage rate of 3.0% obtained by performing a sequentially biaxially stretching method was used in place of the biaxially stretched nylon-6 film (MD/TD=0.95) having a thickness of 15 µm and a hot water shrinkage rate of 4.0%.

Example 8

A packaging material 1 shown in FIG. 1 was obtained in the same manner as in Example 1 except that a biaxially stretched polyethylene terephthalate (PET) film (MD/TD=1.0) having a thickness of 15 µm and a hot water shrinkage rate of 5.0% obtained by performing a sequentially biaxially stretching method was used in place of the biaxially stretched nylon-6 film (MD/TD=0.95) having a thickness of 15 µm and a hot water shrinkage rate of 4.0%.

Example 9

A packaging material 1 shown in FIG. 1 was obtained in the same manner as in Example 1 except that a biaxially stretched polyethylene terephthalate (PET) film (MD/TD=0.9) having a thickness of 15 µm and a hot water shrinkage rate of 15% obtained by performing a sequentially biaxially stretching method was used in place of the biaxially stretched nylon-6 film (MD/TD=0.95) having a thickness of 15 µm and a hot water shrinkage rate of 4.0%.

Comparative Example 4

A packaging material 1 was obtained in the same manner as in Example 8 except that it was structured not to provide an easily adhesive layer 30 (i.e., the black ink layer 10 was directly laminated on one surface of the biaxially stretched polyethylene terephthalate (PET) film 2).

Comparative Example 5

A packaging material 1 was obtained in the same manner as in Example 1 except that a biaxially stretched polyethylene terephthalate (PET) film (MD/TD=0.8) having a thickness of 15 µm and a hot water shrinkage rate of 1.0% obtained by performing a sequentially biaxially stretching method was used in place of the biaxially stretched nylon-6 film (MD/TD=0.95) having a thickness of 15 µm and a hot water shrinkage rate of 4.0%.

Comparative Example 6

A packaging material 1 was obtained in the same manner as in Example 1 except that a biaxially stretched polyethylene terephthalate (PET) film (MD/TD=0.7) having a thickness of 15 µm and a hot water shrinkage rate of 25% obtained by performing a sequentially biaxially stretching method was used in place of the biaxially stretched nylon-6 film (MD/TD=0.95) having a thickness of 15 µm and a hot water shrinkage rate of 4.0%.

Example 10

A packaging material 1 shown in FIG. 1 was obtained in the same manner as in Example 1 except that a biaxially stretched polyethylene naphthalate (PEN) film (MD/TD=0.9) having a thickness of 15 µm and a hot water shrinkage rate of 3.0% obtained by performing a sequentially biaxially stretching method was used in place of the biaxially stretched nylon-6 film (MD/TD=0.95) having a thickness of 15 µm and a hot water shrinkage rate of 4.0%.

Example 11

A packaging material 1 shown in FIG. 1 was obtained in the same manner as in Example 1 except that a biaxially stretched polyethylene naphthalate (PEN) film (MD/TD=0.9) having a thickness of 15 µm and a hot water shrinkage rate of 5.0% obtained by performing a sequentially biaxially stretching method was used in place of the biaxially stretched nylon-6 film (MD/TD=0.95) having a thickness of 15 µm and a hot water shrinkage rate of 4.0%.

Example 12

A packaging material 1 shown in FIG. 1 was obtained in the same manner as in Example 1 except that a biaxially stretched polyethylene naphthalate (PEN) film (MD/TD=0.9) having a thickness of 15 µm and a hot water shrinkage rate of 15% obtained by performing a sequentially biaxially stretching method was used in place of the biaxially stretched nylon-6 film (MD/TD=0.95) having a thickness of 15 µm and a hot water shrinkage rate of 4.0%.

Comparative Example 7

A packaging material 1 was obtained in the same manner as in Example 11 except that it was structured not to provide an easily adhesive layer 30 (i.e., the black ink layer 10 was directly laminated on one surface of the biaxially stretched polyethylene naphthalate (PEN) film 2).

Comparative Example 8

A packaging material 1 shown in FIG. 1 was obtained in the same manner as in Example 1 except that a biaxially stretched polyethylene naphthalate (PEN) film (MD/TD=0.8) having a thickness of 15 µm and a hot water shrinkage rate of 1.0% obtained by performing a sequentially biaxially stretching method was used in place of the biaxially stretched nylon-6 film (MD/TD=0.95) having a thickness of 15 µm and a hot water shrinkage rate of 4.0%.

Comparative Example 9

A packaging material 1 shown in FIG. 1 was obtained in the same manner as in Example 1 except that a biaxially stretched polyethylene naphthalate (PEN) film (MD/TD=0.9) having a thickness of 15 µm and a hot water shrinkage rate of 25% obtained by performing a sequentially biaxially stretching method was used in place of the biaxially stretched nylon-6 film (MD/TD=0.95) having a thickness of 15 µm and a hot water shrinkage rate of 4.0%.

Example 13

A packaging material 1 shown in FIG. 1 was obtained in the same manner as in Example 1 except that the adhesive composition V was used in place of the adhesive agent composition W.

Example 14

A packaging material 1 shown in FIG. 1 was obtained in the same manner as in Example 1 except that the adhesive composition V was used in place of the adhesive agent composition W and a biaxially stretched polyethylene terephthalate (PET) film (MD/TD=0.9) having a thickness of 15 µm and a hot water shrinkage rate of 10% obtained by performing a sequentially biaxially stretching method was used in place of the biaxially stretched nylon-6 film (MD/TD=0.95) having a thickness of 15 µm and a hot water shrinkage rate of 4.0%.

Example 15

A packaging material 1 shown in FIG. 1 was obtained in the same manner as in Example 1 except that the adhesive composition V was used in place of the adhesive agent composition W and a biaxially stretched polyethylene naphthalate (PEN) film (MD/TD=0.9) having a thickness of 15 μm and a hot water shrinkage rate of 5.0% obtained by performing a sequentially biaxially stretching method was used in place of the biaxially stretched nylon-6 film (MD/TD=0.95) having a thickness of 15 μm and a hot water shrinkage rate of 4.0%.

Example 16

A packaging material 1 shown in FIG. 1 was obtained in the same manner as in Example 1 except that the adhesive agent composition Z was used in place of the adhesive agent composition W and a biaxially stretched nylon-6 film (MD/TD=0.9) having a thickness of 15 μm and a hot water shrinkage rate of 10% obtained by performing a simultaneous biaxially stretching method was used in place of the biaxially stretched nylon-6 film (MD/TD=0.95) having a thickness of 15 μm and a hot water shrinkage rate of 4.0%.

Example 17

A packaging material 1 shown in FIG. 1 was obtained in the same manner as in Example 1 except that the adhesive composition Z was used in place of the adhesive agent composition W and a biaxially stretched polyethylene terephthalate (PET) film (MD/TD=0.9) having a thickness of 15 μm and a hot water shrinkage rate of 5.0% obtained by performing a sequentially biaxially stretching method was used in place of the biaxially stretched nylon-6 film (MD/TD=0.95) having a thickness of 15 μm and a hot water shrinkage rate of 4.0%.

Example 18

A packaging material 1 shown in FIG. 1 was obtained in the same manner as in Example 1 except that the adhesive composition Z was used in place of the adhesive agent composition W and a biaxially stretched polyethylene naphthalate (PEN) film (MD/TD=0.9) having a thickness of 15 μm and a hot water shrinkage rate of 4.0% obtained by performing a sequentially biaxially stretching method was used in place of the biaxially stretched nylon-6 film (MD/TD=0.95) having a thickness of 15 μm and a hot water shrinkage rate of 4.0%.

Each packaging material obtained as mentioned above was evaluated based on the following evaluation method. The results are shown in Tables 1 to 4.

TABLE 1

| | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Outer layer structure | Resin type | Nylon | Nylon | Nylon | Nylon | Nylon | Nylon | Nylon | Nylon | Nylon |
| | Hot water shrinkage rate (%) | 4.0 | 2.5 | 3.5 | 5.0 | 10 | 15 | 4.0 | 1.0 | 25 |
| Easily adhesive agent layer structure | Adhesive agent composition | W | W | W | W | W | W | | W | W |
| | Formed amount (g/m²) | 0.1 | 0.1 | 0.1 | 0.1 | 0.1 | 0.1 | | 0.1 | 0.1 |
| Evaluation of presence or absence of detachment in a packaging material | Immediately after deep drawing | ◎ | ◎ | ◎ | ◎ | ○ | ○ | ◎ | X | X |
| | After High temperature high humidity test | ◎ | ◎ | ◎ | ◎ | ○ | ○ | X | ○ | ○ |

TABLE 2

| | | Ex. 7 | Ex. 8 | Ex. 9 | Comp. Ex. 4 | Comp. Ex. 5 | Comp. Ex. 6 |
|---|---|---|---|---|---|---|---|
| Outer layer structure | Resin type | PET | PET | PET | PET | PET | PET |
| | Hot water shrinkage rate (%) | 3.0 | 5.0 | 15 | 5.0 | 1.0 | 25 |
| Easily adhesive agent layer structure | Adhesive agent composition | W | W | W | | W | W |
| | Formed amount (g/m²) | 0.1 | 0.1 | 0.1 | | 0.1 | 0.1 |
| Evaluation of presence or absence of detachment in a packaging material | Immediately after deep drawing | ○ | ◎ | ○ | ◎ | X | X |
| | After High temperature high humidity test | ◎ | ◎ | ○ | X | ○ | ○ |

TABLE 3

|  |  | Ex. 10 | Ex. 11 | Ex. 12 | Comp. Ex. 7 | Comp. Ex. 8 | Comp. Ex. 9 |
|---|---|---|---|---|---|---|---|
| Outer layer structure | Resin type | PEN | PEN | PEN | PEN | PEN | PEN |
|  | Hot water shrinkage rate (%) | 3.0 | 5.0 | 15 | 5.0 | 1.0 | 25 |
| Easily adhesive agent layer structure | Adhesive agent composition | W | W | W |  | W | W |
|  | Formed amount (g/m²) | 0.1 | 0.1 | 0.1 |  | 0.1 | 0.1 |
| Evaluation of presence or absence of detachment in a packaging material | Immediately after deep drawing | ○ | ○ | ○ | ○ | X | X |
|  | After High temperature high humidity test | ○ | ○ | ○ | X | ○ | ○ |

TABLE 4

|  |  | Ex. 13 | Ex. 14 | Ex. 15 | Ex. 16 | Ex. 17 | Ex. 18 |
|---|---|---|---|---|---|---|---|
| Outer layer structure | Resin amount | NYLON | PET | PEN | NYLON | PET | PEN |
|  | Hot water shrinkage rate (%) | 4.0 | 10 | 5.0 | 10 | 5.0 | 4.0 |
| Easily adhesive agent layer structure | Adhesive agent composition | V | V | V | Z | Z | Z |
|  | Formed amount (g/m²) | 0.1 | 0.1 | 0.1 | 0.1 | 0.1 | 0.1 |
| Evaluation of presence or absence of detachment in a packaging material | Immediately after deep drawing | ⊚ | ○ | ○ | ⊚ | ⊚ | ○ |
|  | After High temperature high humidity test | ⊚ | ○ | ○ | ○ | ○ | ○ |

<Evaluation Method of Presence or Absence of Detachment>

For each Example and Comparative Example, 30 pieces of packaging materials were manufactured. On each of them, presence or absence of detachment of the colored ink layer (black ink layer) was examined by the naked eye, etc., in the following two states a), and b), and evaluated based on the following evaluation standard.

(Evaluation Standard)

"⊚": 0 (zero) colored ink layer was detached from the heat resistant resin stretched film layer among 30 colored ink layers "○": 1 or 2 colored ink layer was detached from the heat resistant resin stretched film layer among 30 colored ink layers "Δ": 3 or 4 colored ink layer was detached from the heat resistant resin stretched film layer among 30 colored ink layers "X": 5-30 colored ink layer was detached from the heat resistant resin stretched film layer among 30 colored ink layers a) a packaging material immediately after performing deep drawing (a molded case immediately after forming obtained by deep drawing a packaging material which was confirmed that there was no detachment of the colored ink layer into a rectangular parallelepiped shape of 50 mm long×35 mm wide×6.0 mm deep using a punch, a die, etc., in a state in which the inner polypropylene layer 3 was brought into contact with the punch), b) a packaging material immediately after performing a high temperature high humidity test (a packaging material which was confirmed that there was no detachment of the colored ink layer was kept in a high temperature high humidity test machine of 85° C.×95% RH for 72 hours, then taken out therefrom and left for 5 days at normal temperature.

As will be apparent from Tables 1-4, in the packaging materials of Examples 1-18 of the present invention, the heat resistant resin stretched film was within a range of 2% to 20% and the heat resistant resin stretched film and the colored ink layer were adhered by the easily adhesive layer. Therefore, even subjected deep drawing, the colored ink layer was not detached from the heat resin stretched film layer, and even used in a somewhat harsh environment such as high-temperature and humidity, the colored ink layer was not detached from the heat resistant resin stretched film layer.

On the other hand, in Comparative Examples 1-9, the hot water shrinkage rate of the heat resistant resin stretched film layer deviated from the range of 2% to 20%, or no easily adhesive layer was arranged between the heat resistant resin stretched film layer and the colored ink layer. Therefore, in at least either one of the aforementioned states a) and b), the evaluation of presence or absence of detachment of the colored ink layer was "X."

INDUSTRIAL APPLICABILITY

The packaging material according to some preferred embodiments of the present invention can be preferably used as a case for a stationary type secondary battery (lithium ion polymer secondary battery) or a secondary battery (lithium ion polymer secondary battery) for use in, e.g., laptop computers, mobile phones, or automobiles, and also preferably used as a packaging material for, e.g., food products or pharmaceutical products, but not specifically limited to these intended purposes. Among them, it is especially preferred to be used as a battery case. Further, the packaging material of the present invention is preferably used as a molding packaging material.

This application claims priority to Japanese Patent Application No. 2013-156959 filed on Jul. 29, 2013, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

DESCRIPTION OF SYMBOLS

1 . . . Packaging material
2 . . . Heat resistant resin stretched film layer (outer layer)
3 . . . Thermoplastic resin layer (inner layer)
4 . . . Metal foil layer
10 . . . Colored ink layer
20 . . . Matte coat layer
30 . . . Easily adhesive layer

The invention claimed is:

1. A battery case formed by deep drawing or bulging a packaging material, the battery case comprising:
   a heat resistant resin stretched film layer as an outer layer;
   a thermoplastic resin layer as an inner layer;
   a metal foil layer arranged between the heat resistant resin stretched film layer and the thermoplastic resin layer;
   a colored ink layer arranged between the metal foil layer and the heat resistant resin stretched film layer;
   an easily adhesive layer located between the heat resistant resin stretched film layer and the colored ink layer; and
   a first adhesive agent layer that integrally adheres the colored ink layer and the metal foil layer to each other,
   wherein as the heat resistant resin stretched film, a heat resistant resin stretched film having a hot water shrinkage rate of 2% to 20% is used, and
   wherein the heat resistant resin stretched film layer and the colored ink layer are integrally laminated to each other via the easily adhesive layer.

2. The battery case as recited in claim 1, wherein the easily adhesive layer contains one or more kinds of resins selected from the group consisting of an epoxy resin, a urethane resin, an acrylic acid ester resin, a methacrylic acid ester resin, and a polyethylenimine resin.

3. The battery case as recited in claim 1, wherein the easily adhesive layer contains a urethane resin and an epoxy resin.

4. The battery case as recited in claim 3, wherein in the easily adhesive layer, a content mass ratio of the urethane resin/the epoxy resin is within a range of 98/2 to 40/60.

5. The battery case as recited in claim 1, wherein the easily adhesive layer contains one or more kinds of acrylic resins selected from the group consisting of an acrylic acid ester resin and a methacrylic acid ester resin, and an epoxy resin.

6. The battery case as recited in claim 5, wherein in the easily adhesive layer, a content mass ratio of the acrylic resin/the epoxy resin is within a range of 98/2 to 40/60.

7. The battery case as recited in claim 1, wherein the easily adhesive layer is an adhesive layer formed by applying a resin-aqueous emulsion on the heat resistant resin stretched film layer.

8. The battery case as recited in claim 1, wherein as the heat resistant resin stretched film, a biaxially stretched polyamide film having a hot water shrinkage rate of 2% to 20%, a biaxially stretched polyethylene naphthalate film having a hot water shrinkage rate of 2% to 20%, or a biaxially stretched polyethylene terephthalate film having a hot water shrinkage rate of 2% to 20% is used.

9. The battery case as recited in claim 1, wherein the hot water shrinkage rate of the heat resistant resin stretched film is 2.5% to 10%.

10. The battery case as recited in claim 1, wherein the colored ink layer is a black ink layer which contains carbon black, diamine, polyol, and a diisocyanate.

11. The battery case as recited in claim 10, wherein in the black ink layer, a content rate of the carbon black is 15 mass % to 60 mass %, and a total content rate of the diamine, polyol, and the curing agent is 40 mass % to 85 mass %.

12. The battery case as recited in claim 1, further comprising a matte coat layer laminated on an outer surface of the heat resistant resin stretched film layer.

13. The battery case as recited in claim 12, wherein the matte coat layer is made of a resin composition containing a two-liquid curing type heat resistant resin and fine inorganic particles having an average particle size of 1 μm to 10 μm, and a content rate of the fine inorganic particles in the resin composition is 0.1 mass % to 60 mass %.

14. A battery case formed by deep drawing or bulging a packaging material, the battery case comprising:
   a heat resistant resin stretched film layer as an outer layer;
   a thermoplastic resin layer as an inner layer;
   a metal foil layer arranged between the heat resistant resin stretched film layer and the thermoplastic resin layer;
   a colored ink layer arranged between the metal foil layer and the heat resistant resin stretched film layer;
   an easily adhesive layer located between the heat resistant resin stretched film layer and the colored ink layer; and
   a first adhesive agent layer that integrally adheres the colored ink layer and the metal foil layer to each other,
   wherein as the heat resistant resin stretched film, a heat resistant resin stretched film having a hot water shrinkage rate of 2% to 20% is used,
   wherein the heat resistant resin stretched film layer and the colored ink layer are integrally laminated to each other via the easily adhesive layer,
   wherein a matte coat layer is laminated on an outer surface of the heat resistant resin stretched film layer,
   wherein the colored ink layer contains carbon black, a content rate of the carbon black in the colored ink layer is 20 mass % to 50 mass %, and a thickness of the colored ink layer is 1 μm to 4 μm,
   wherein the easily adhesive layer contains one or more acrylic resins selected from the group consisting of an acrylic acid ester resin and a methacrylic acid ester resin, and an epoxy resin, and
   wherein in the easily adhesive layer, a content mass ratio of the acrylic resin/the epoxy resin is within a range of 98/2 to 40/60.

* * * * *